No. 869,642. PATENTED OCT. 29, 1907.
C. D. McAFEE.
HOOF EXPANDING PAD.
APPLICATION FILED MAY 13, 1907.
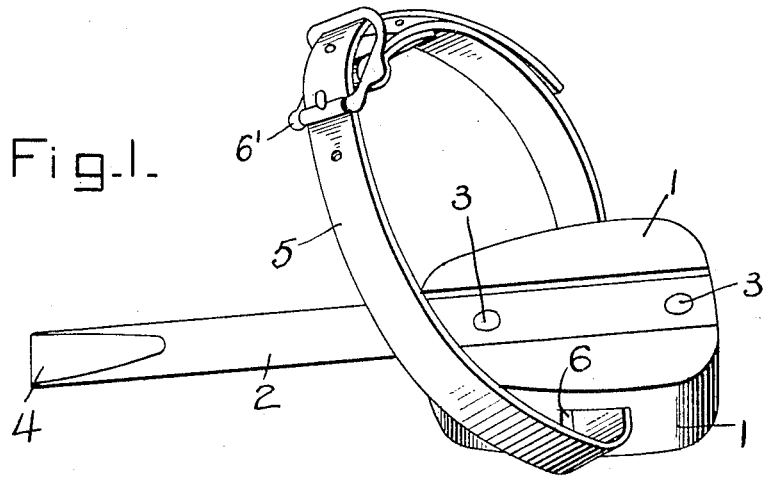
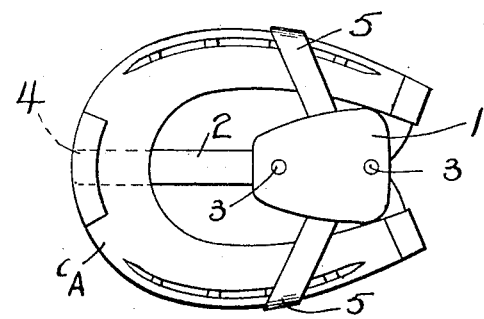
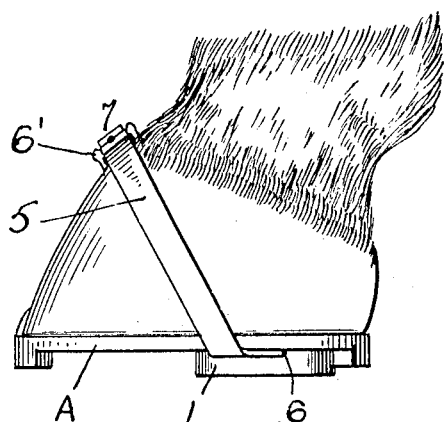
Witnesses
Jesse C. Miller.
Arthur W. Crossley.
Inventor
Charles D. McAfee.
By Chandler & Chandler
Attorneys

UNITED STATES PATENT OFFICE.

CHARLES D. McAFEE, OF BURGETTSTOWN, PENNSYLVANIA.

HOOF-EXPANDING PAD.

No. 869,642.

Specification of Letters Patent.

Patented Oct. 29, 1907.

Application filed May 13, 1907. Serial No. 373,392.

*To all whom it may concern:*

Be it known that I, CHARLES D. McAFEE, a citizen of the United States, residing at Burgettstown, in the county of Washington, State of Pennsylvania, have invented certain new and useful Improvements in Hoof-Expanding Pads; and I do hereby declare the following to be a full, clear, and exact description of the invention, such as will enable others skilled in the art to which it appertains to make and use the same.

This invention has relation to means for expanding the hoof of a horse's foot by providing means which will cause the weight or partial weight of the animal to bear upon the frog of the foot when traveling or standing so as to cause the sides of the rear of the hoof to spread outwardly.

It is the object of my invention to provide improvements in the means specified whereby they will be rendered more efficient and at the same time be simplified in construction and accordingly reduced in cost of manufacture.

The nature of the invention is fully and clearly ascertainable from the device portrayed in the annexed drawings, forming a part of this specification, in view of which it will first be described with respect to its construction and mode of operation, and then be pointed out in the subjoined claims.

Of the said drawings—Figure 1 is a perspective view of the invention detached. Fig. 2 is a bottom view of a shoe and hoof of a horse showing my improvement applied. Fig. 3 is a side elevation of the invention applied.

Similar characters of reference designate similar parts or features, as the case may be, wherever they occur.

In the drawings 1 designates a pad that may be composed of relatively soft rubber—that is, rubber that is vulcanized to an extent to render it firm, but not to a degree to deprive it of its elastic properties. Any other substance having substantially the same properties as rubber under the same conditions will answer as well. The shape of the pad is such as to conform generally to the outline of the frog of the hoof—approaching the form of a triangle, and its thickness will be such that when put in position on the frog of a shod hoof, the lower surface will extend on a plane below the plane of the lower surface of the shoe, so that the material weight of the horse in walking or standing will be brought upon the frog of the foot through the intervention of the pad.

2 designates a metal bar inset in the pad at its rear end and secured thereto by bolt rivets 3 3 extending through the bar and the pad, as shown. The forward end of the bar 2 is flattened and gradually thinned down to an almost sharpened end 4 that extends under the toe of the hoof and between the latter and the upper surface of the shoe to hold it in place, and to this end the hoof may be dressed somewhat to give the end 4 a fit therein without altering the construction of the shoe or interfering with its placement.

5 designates a strap that is passed through a lateral slot 6 formed in the pad 1 below the bar 2, one end of the said strap being provided with a buckle 6, and the other end being formed as a tongue to engage the buckle, whereby the said strap can be carried over the upper front part of the hoof and buckled, as at 7, to hold the pad vertically in place.

By the simple means specified a hoof-expanding pad can be applied to the hoof of a horse without modifying the construction of the shoe, and, indeed, without removing the shoe, and adjusted and held in place to answer peculiar requirements. If need be the pad can easily and quickly be removed for a time and again replaced with very little trouble and in a very little time.

It is obvious that the operation of the device will be such as to expand the hoof, and assuredly obviate contraction of the hoof and all of its attendant disadvantages due to shoeing.

What is claimed is—

A hoof-expanding pad, comprising a pad proper composed of a firm elastic substance, as described, having a form in outline corresponding to the general outline of the frog of the foot, and of a thickness sufficient to bear on the frog and extend below the plane of the lower surface of the shoe, the said pad having a bar connected therewith at its rear end, the forward end being flattened and thinned down to adapt it to extend over the shoe at the toe point, and a strap connected with the pad and adapted to be extended up over the forward upper surface of the hoof and tightly buckled thereon.

In testimony whereof, I affix my signature, in presence of two witnesses.

CHARLES D. McAFEE.

Witnesses:
ALEX. McCLINTOCK.
D. W. STUDD.